United States Patent [19]

Fujiwara et al.

[11] Patent Number: 4,709,303
[45] Date of Patent: Nov. 24, 1987

[54] ELECTRIC DOUBLE LAYER CAPACITOR

[75] Inventors: Makoto Fujiwara; Hajime Yoneda; Masafumi Okamoto, all of Kyoto, Japan

[73] Assignee: Matsushita Electric Industrial Co., Ltd., Japan

[21] Appl. No.: 903,566

[22] PCT Filed: Dec. 24, 1985

[86] PCT No.: PCT/JP85/00706
§ 371 Date: Aug. 22, 1986
§ 102(e) Date: Aug. 22, 1986

[87] PCT Pub. No.: WO86/03884
PCT Pub. Date: Jul. 3, 1986

[30] Foreign Application Priority Data

Dec. 25, 1984 [JP] Japan .............................. 59-277221

[51] Int. Cl.⁴ .............................................. H01G 9/00
[52] U.S. Cl. ..................................................... 361/433
[58] Field of Search ......................................... 361/433

[56] References Cited

U.S. PATENT DOCUMENTS

| | | | |
|---|---|---|---|
| 2,733,389 | 1/1956 | Ellison | 361/433 |
| 3,700,975 | 10/1972 | Butherus et al. | 361/433 |
| 4,313,084 | 1/1982 | Hosokawa et al. | 361/433 |
| 4,394,713 | 7/1983 | Yoshida | 361/433 |
| 4,542,444 | 9/1985 | Boland | 361/433 |
| 4,563,723 | 1/1986 | Meyers | 361/433 |

Primary Examiner—Donald A. Griffin
Attorney, Agent, or Firm—Lowe, Price, LeBlanc, Becker & Shur

[57] ABSTRACT

The invention relates to an electric double layer capacitor in which a metallic piece for a case at the side of an anode is formed with an aluminum layer. The aluminum layer has an electrochemically stable anodized film according to an applied voltage and has so low a resistance as not to present any practical problem. This property is effectively utilized to impart a breakdown voltage not less than 3 V to the capacitor.

5 Claims, 7 Drawing Figures

ELECTRIC DOUBLE LAYER CAPACITOR

TECHNICAL FIELD

This invention relates to an electric double layer capacitor utilizing an electric double layer formed at the interface between polarizable electrodes and an electrolyte.

BACKGROUND TECHNOLOGY

Known electric double layer capacitors of the type mentioned above are comprised of, as shown in FIG. 1, polarizable electrodes 1 which are obtained by press molding of active carbon particles, by applying a mixture of active carbon particles and an appropriate binder onto a collector metal, or by forming a spray coating layer of aluminium on active carbon fibers. The polarizable electrodes 1 are accomodated in a stainless steel case 2 and are facing each other through an electrolytic solution and a separator 3. The metallic case 2 is sealed through a gasket 4 at a peripheral opening thereof.

Another type of known capacitor now in use is shown in FIG. 2 in which a non-polarizable electrode 5 is used as one electrode.

In these known arrangements, solvents used for the electrolytic solution are propylene carbonate, r-butyrolactone, N,N-dimethylformaldehyde, and acetonitrile. In the case of polarization at the anode, the stainless steel in the electrolytic solution cannot make a complete passive state but dissolves in the solution. The potential at which the current starts to run owing to the dissolution is 2.3–2.4 volts which is determined depending on the decomposition potential of the solvent at the cathode. This is lower than the potential of oxidation of active carbon or the potential of decomposition of the electrolyte in the electrolytic solution using the organic solvents. Accordingly, when the stainless steel case 2 is used as a current collector, the potential at the anode is restricted by the potential of dissolution of the stainless steel, so that a potential of 3 V which is in an electrochemically stable potential region determined by the polarizable electrode 1 and the electrolytic solution could not be effectively utilized.

For instance, when an excess voltage over a voltage at which a leakage current starts to increase is applied, large amounts of iron, nickel and the like are detected in the electrode at the side of the anode, from which it has been confirmed that the stainless steel is dissolved and iron ions are moved from the anode toward the cathode.

As will be seen from the above, when stainless steel is used as the metallic case 2, it is difficult to effectively utilize a potential of 3 V which is in an electrochemically stable region determined by the active carbon polarizable electrode 1 and the electrolytic solution. In order to obtain an electric double layer capacitor of a breakdown voltage which enables one to use 3 V, it is necessary to use a material which allows passage of a reactive current at a potential equal to or larger than the active carbon of the polarizable electrode 1 and which has sufficient strength when the anode is subjected to polarization in a solvent used.

One such a material may be titanium which forms a passive state in electrolytic solutions. As shown in FIG. 3, however, the breakdown voltage becomes higher than in the case using stainless steel. With electrolytic solutions using propylene carbonate and tetraethylammonium perchlorate, the region where the reactive current flows increases by about 0.8 V. However, the internal resistance increases, so that when the voltage drop becomes large in the case where the electric double layer capacitor is used, there is an attendant problem that such a capacitor cannot be in use. The present invention is contemplated to solve the above problem and has for its object the provision of an electric double layer capacitor which has a high breakdown voltage over 3 V.

DISCLOSURE OF THE INVENTION

The present invention contemplates to solve the above problem and has for its object the provision of an electric double layer capacitor having a high breakdown voltage over 3 V.

More particularly, the present invention has such an arrangement that a metallic case piece at the side of an anode which is in contact with a conductive electrode and electrolyte is provided with an aluminium layer on the inner surface thereof. When aluminium is formed on the surface in contact with the electrolyte, an oxide film is formed on the aluminium layer according to an been applied voltage. In a region to which a voltage has once applied, no reactive current passes, so that the reaction of dissolution can be inhibited. Thus, there can be obtained an electric double layer capacitor which is electrochemically stable even when a potential of 3 V is applied.

Because the aluminium oxide film thickness is small and thus the resistance is low, an increase of the internal resistance as in the case using titanium does not occur at a low voltage of about 3 volts. In this case, the collector metal serves also as a material for the case and should have high strength sufficient for the case. If the case is constituted of aluminium alone, the strength is not satisfactory. In addition, because a limitation is placed on the thickness of the case from the standpoint of a product size, too large a thickness is not practical. Under these restricting conditions, it is necessary to use a material, such as stainless steel, which has little problem in electric connection on use as an external terminal and high strength, in combination with aluminium.

BEST MODE FOR CARRYING OUT THE INVENTION

Embodiments of the invention are described with reference to FIGS. 4 through 7.

Figure 1:
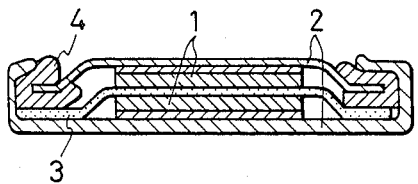
FIGS. 1 and 2 are, respectively, sectional views of known electric double layer capacitors.
Figure 2:
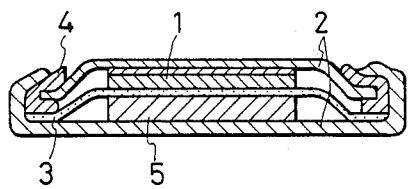
Figure 3:
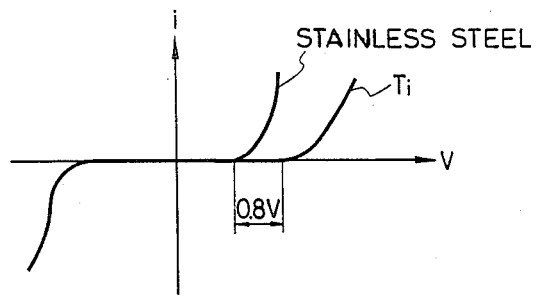
FIG. 3 is a potential-current characteristic of electric double layer capacitors using stainless steel and titanium.
Figure 4:
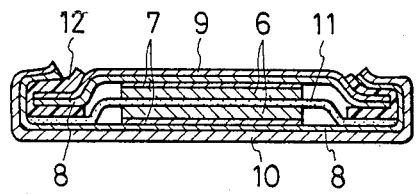
FIG. 4 is a sectional view of an electric double layer capacitor according to one embodiment of the invention.

An embodiment shown in FIG. 4 includes polarizable electrodes 6 each made of an active carbon fiber cloth or a molding of a mixture of an active carbon powder and a binder. An aluminium conductive electrode 7 is formed on one side of the electrodes 6 by plasma spray coating. The polarizable electrodes 6 are encased in metallic case pieces 9, 10 of stainless steel which have an aluminium layer 8 on the inner surfaces thereof in such a way that the conductive electrodes 7 contact the inner surfaces of the case pieces 9,10. The conductive electrodes 7 are connected to the metallic case pieces 9, 10 by spot welding. One of the polarizable electrodes 6 which is a counter electrode at the side of the cathode is impregnated with an electrolytic solution which has 10 wt% of tetraethylammonium tetrafluoroborate added to propylene carbonate. An ionpermeable separator 11 is provided between the polarizable electrodes 6 and a gasket 12 is arranged around the opened periphery of the metallic case pieces 9, 10 and the metallic piece 10 is subjected to curling to complete a sealed case.

Figure 5:
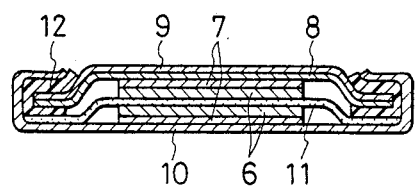
FIGS. 5–7 are, respectively, sectional views of further embodiments of the invention.

A capacitor shown in FIG. 5 is an embodiment where no aluminium layer is formed on the inner surface of the metallic case piece 10 at the side of the anode.

Figure 6:
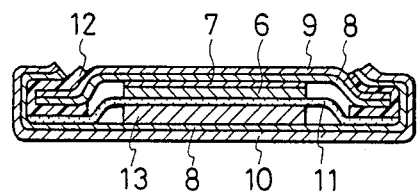

In FIG. 6, there is shown a capacitor which is similar to FIG. 4 but a non-polarizable counter electrode 13 of, for example, lithium is used as a cathode and the metallic case pieces 9, 10 have, respectively, aluminium layers 8 on the inner surfaces thereof.

Figure 7:
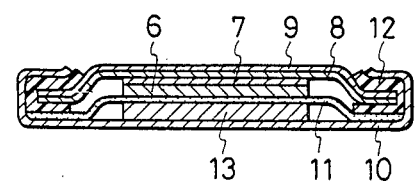

FIG. 7 shows another embodiment in which a non-polarizable electrode is used as the counter electrode 13 and the metallic case piece 10 has no inner aluminium layer at the side of the counter electrode 13.

The metallic case pieces 9, 10 may be made of, aside from stainless steel, iron, nickel, titanium and copper alloys.

The present invention is described by way of examples.

Example 1

In the embodiments shown in FIGS. 4 and 5, a 250 micrometer thick aluminium conductive electrode 7 is formed by plasma spray coating on one surface of a polarizable electrode 6 consisting of a phenolic active carbon fiber cloth (thickness 0.5 mm, specific surface area 2000 m$^2$/g). This double-layered construction is punched in the form of a disk having a diameter of 2 cm to obtain electrodes. The electrodes are impregnated with an electrolytic solution having 10 wt% of tetraethylammonium tetrafluoroborate in propylene carbonate, after which they are superposed through separator 11. This unit is encased in a stainless steel case made of pieces 9, 10 which is covered with an aluminium layer 8 (such as a layer having a purity of 99.86% and a thickness of 70 micrometers or a layer having a purity of 99.99% and a thickness of 60 micrometers) only on the inner surface contacting the anode and on inner surfaces contacting both electrodes. A gasket 12 is provided in an opening end between the metallic case pieces 9, 10 and caulked to close the opening.

Several characteristics of the electric double layer capacitors according to the invention are indicated in Table 1 as Nos. 1–3. In Table 1, characteristics of an electric double layer capacitor for comparison in which the stainless steel case is not covered with aluminium on the inner surfaces thereof are indicated as No. 6.

EXAMPLE 2

Coconut shell active carbon particles are mixed with a polyflon binder and molded (thickness 0.5 mm, specific surface area 800 m$^2$/g) to obtain a polarizable electrode 6. The electrode is formed with a 250 micrometer thick aluminium conductive electrode 7 by plasma spray coating. This double-layered construction is punched into disks having a diameter of 2 cm to obtain electrodes. The electrodes are impregnated with an electrolytic solution of 10 wt% of tetraethylammonium tetrafluoroborate in propylene carbonate and superposed through a separator 11 and sandwiched between metallic case pieces 9, 10 in which the stainless steel case piece 9 alone or pieces 9, 10 are covered with an aluminium layer 8 (purity 99.86%, thickness 70 micrometers) on the inner surface or surfaces thereof The metallic case pieces 9, 10 are closed with a gasket 12 at the opening therebetween.

In Table 1, the characteristics of the electric double layer capacitors of the invention are shown as Nos. 4 and 5.

TABLE 1

| No. | Case Construction | Active Carbon | Capacitance | Internal Resistance | Breakdown Voltage | Life under high temperature & loading conditions 3.0 V, 70° C. 1000 hours (Variation in capacitance) |
| --- | --- | --- | --- | --- | --- | --- |
| Capacitors of Invention: | | | | | | |
| 1 | anode: Al-covered stainless steel (Al purity: 99.86%) cathode: stainless steel | phenolic active carbon fibers | 3 F | 0.16 ohms | 3 V | −5% |
| 2 | anode: Al-covered stainless steel (Al purity: 99.99%) cathode: stainless steel | phenolic active carbon fibers | 3 F | 0.16 ohms | 3 V | −5% |
| 3 | anode: Al-covered stainless steel (Al purity: 99.99%) cathode: Al-covered stainless steel (Al purity: 99.86%) | phenolic active carbon fibers | 3 F | 0.16 ohms | 3 V | −5% |
| 4 | anode: Al-covered stainless steel (Al purity: | coconut shell active carbon particles | 0.8 F | 0.1 ohm | 3 V | −5% |

TABLE 1-continued

| No. | Case Construction | Active Carbon | Capacitance | Internal Resistance | Breakdown Voltage | Life under high temperature & loading conditions 3.0 V, 70° C. 1000 hours |
|---|---|---|---|---|---|---|
| | 99.86%) cathode: stainless steel | | | | | |
| 5 | anode: Al-covered stainless steel (Al purity: 99.86%) cathode: Al-covered stainless steel (Al purity: 99.99%) | coconut shell active carbon particles | 0.8 F | 0.1 ohm | 3 V | −5% |
| Prior Art Capacitor: | | | | | | |
| 6 | stainless steel for both anode and cathode | phenolic active carbon fibers | 3 F | 0.16 ohms | 2.3 V | −95% |

EXAMPLE 3

TABLE 2

| No. | Case Construction | Combinations of Electrodes | Capacitance | Internal Resistance | Breakdown Voltage | Life under High Temperature and Loading Conditions 3.0 V, 70° C. 1000 hours |
|---|---|---|---|---|---|---|
| | | | | | | (Variation in capacitance) |
| Capacitors of Invention: | | | | | | |
| 1 | anode: covered stainless steel (Al purity: 99.99%) cathode: stainless steel | facing type of a polarizable electrode & a non-polarizable electrode | 6 F | 0.15 ohms | 3 V | −5% |
| 2 | anode: Al-covered stainless steel Al purity: 99.99%) cathode: Al-covered stainless steel | | 6 F | 0.15 ohms | 3 V | −5% |
| Prior-art Capacitor: | | | | | | |
| 3 | stainless steel for both an anode and a cathode | | 6 F | 0.15 ohms | 2.8 V | −505% |

As shown in FIGS. 6 and 7, a polarizable electrode 6 of an acrylic active carbon fiber cloth (thickness 0.5 mm, specific surface area 800 m²/g) is formed with a 250 micrometer thick aluminium conductive electrode 7 by plasma spray coating. This double-layered construction is punched into a disk having a diameter of 2 cm, thereby obtaining an anode electrode. This electrode is superposed with a lithium non-polarizable electrode 13 having a diameter of 2 cm through a separator 11 to obtain an electrode pair. This pair is impregnated with an electrolytic solution of 10 wt% of lithium tetrafluoroborate in propylene carbonate and sandwiched with stainless steel case pieces 9, 10 in which the stainless steel piece 9 alone or the pieces 9, 10 are covered with an aluminum layer (purity 99.99%, thickness 60 micrometers) on the inner surfaces thereof. The opening end between the case pieces 9, 10 is provided with a gasket 12 and caulked to close the pieces.

In Table 2, there are shown characteristics of the electric double layer capacitors of the invention as Nos. 1 and 2. For comparison, there are also shown characteristics of an electric double layer capacitor in which no aluminium layer is formed on the inner surfaces of a metallic case as No. 3.

INDUSTRIAL UTILITY

As will be understood from the foregoing, according to the present invention, an electric double layer capacitor of a high breakdown voltage of 3 V or higher can be readily fabricated in which an aluminium layer is formed at least on the inner surface of a metallic case at the side of the anode. The aluminium layer is formed with an electrochemically stable anodized film according to an applied voltage and the resistance of the film is so low as not to present practical problems. This property of the aluminium film is effectively utilized for the fabrication.

What is claimed is:

1. An electric double layer capacitor, which comprises a polarizable electrode having a conductive electrode on one side thereof, a counter electrode provided on the other side of said polarizable electrode, an electrolytic solution, a separator arranged between the polarizable and counter electrodes, and two metallic pieces which sealingly encase said polarizable electrode and said counter electrode and which are electrically interconnected with the polarizable and counter electrodes, respectively, at least one metallic piece being located at the side of the polarizable electrode and being provided with an aluminum layer on a surface contacting the conductive electrode and the electrolytic solution.

2. An electric double layer capacitor according to claim 1, wherein said counter electrode is a polarizable electrode of active carbon fibers or powder having a conductive electrode on one side thereof.

3. An electric double layer capacitor according to claim 1, wherein said counter electrode is a non-polarizable electrode.

4. An electric double layer capacitor according to claim 1, wherein said conductive electrode is made of aluminium.

5. An electric double layer capacitor according to claim 5, wherein said metallic pieces are made of a member selected from the group consisting of stainless steel, iron, nickel, titanium, and copper alloys.

* * * * *